United States Patent [19]
Imai et al.

[11] 3,947,860
[45] Mar. 30, 1976

[54] REMOTE FOCUSING DEVICE FOR CAMERAS

[75] Inventors: Tadayuki Imai, Kawasaki; Toshitaka Shiratori, Sohka, both of Japan

[73] Assignee: Ricoh Co., Ltd., Tokyo, Japan

[22] Filed: Sept. 16, 1974

[21] Appl. No.: 505,969

Related U.S. Application Data

[63] Continuation of Ser. No. 419,524, Nov. 28, 1973, abandoned.

[30] Foreign Application Priority Data

Dec. 4, 1972  Japan .............................. 47-138475

[52] U.S. Cl. ............................................. 354/195
[51] Int. Cl.² .......................................... G03B 3/00
[58] Field of Search ..................................... 354/195

[56] References Cited
UNITED STATES PATENTS
3,798,670  3/1974  Tanaka ............................... 354/195

*Primary Examiner*—John M. Horan
*Attorney, Agent, or Firm*—Cooper, Dunham, Clark, Griffin & Moran

[57] ABSTRACT

A remote focusing device for cameras is disclosed in which a focusing ring is rotatably disposed around the shutter release button coaxially thereof and is operatively coupled to a mechanism for moving the camera lens in such a way that when the focusing ring is rotated, the camera lens may be moved in the direction of the optical axis thereof for focusing.

7 Claims, 2 Drawing Figures

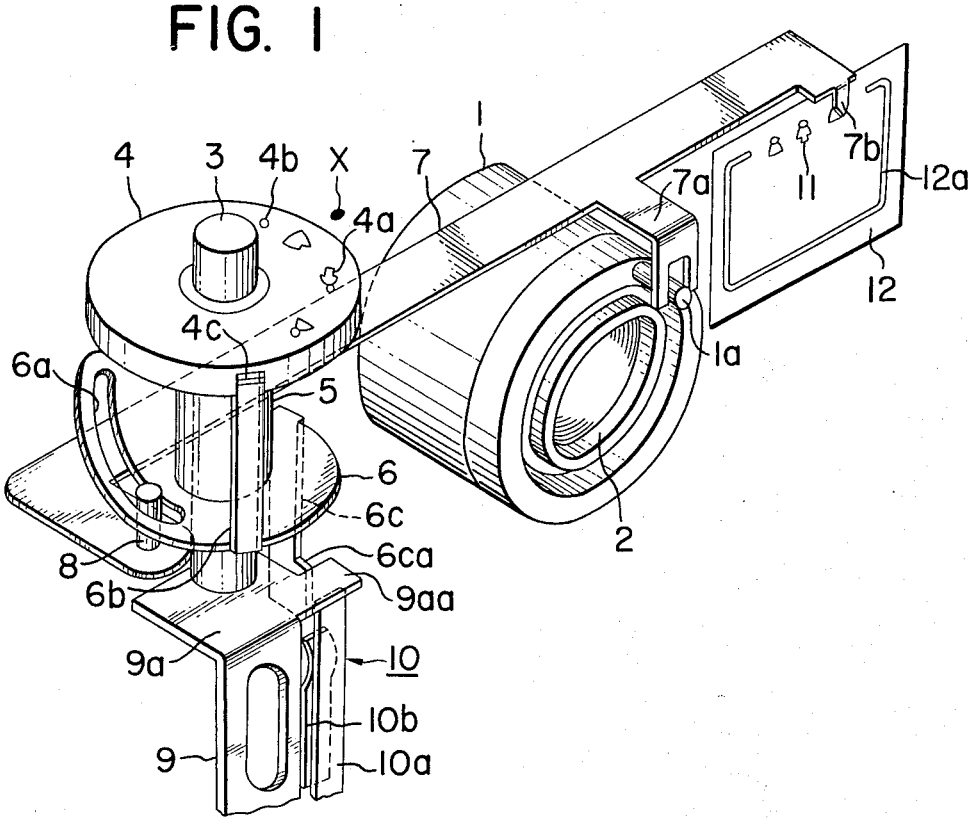
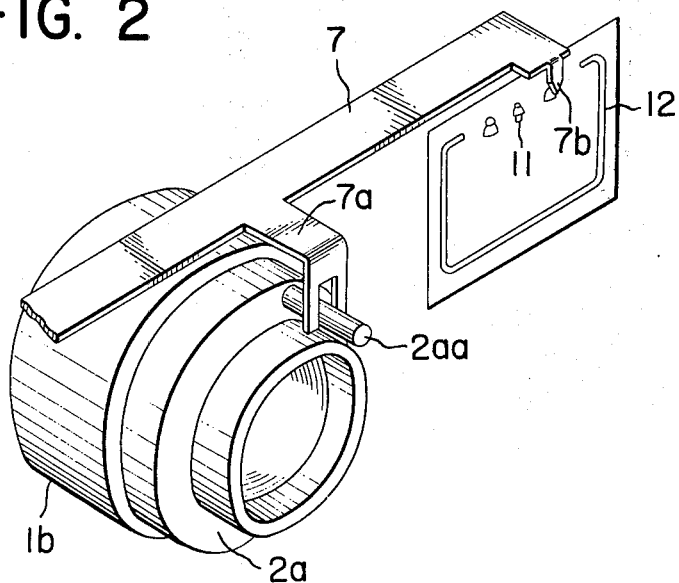

REMOTE FOCUSING DEVICE FOR CAMERAS

This is a continuation of application Ser. No. 419,524 filed Nov. 28, 1973, now abandoned.

BACKGROUND OF THE INVENTION

The present invention relates to a remote focusing device for cameras.

With a conventional still camera, an operator rotates by one hand the lens barrel while he is holding the camera body by the other hand, so that he cannot hold the camera in a stabilized manner without difficulty and as a result the camera may shake.

SUMMARY OF THE INVENTION

One of the objects of the present invention is therefore to provide a remote focusing device simple in construction yet reliable in operation.

According to one preferred embodiment of the present invention, the focusing may be accomplished by rotating a focusing ring disposed in spaced apart relation with the camera lens and rotatably around a shutter release button and operatively coupled to a focusing mechanism. Since the focusing mechanism, the shutter release mechanism and the shutter release button locking mechanism are concentrated in one position, these mechanisms may be made compact in size, and easy, quick and correct operation of a camera may be greatly faciliated.

The above and other objects, features and advantages of the present invention will become more apparent from the following description of the preferred embodiments thereof taken in conjunction with the accompanying drawing.

BRIEF DESCRIPTION OF THE DRAWING

FIG. 1 is a perspective view of a first embodiment of the present invention; and FIG. 2 is a perspective view of a second embodiment of the present invention.

DESCRIPTION OF THE PREFERRED EMBODIMENTS

First Embodiment, FIG. 1

Referring to FIG. 1, a camera lens 2 held by a lens barrel mount 1 having a focusing pin 1a is adapted to move forward and backward as the lens barrel mount 1 is rotated through a suitable conventional mechanism such as a cylindrical cam and a cam follower. A shutter release button 3 in the form of a cylinder is vertically slidably fitted into a sleeve 5 at the upper end of which is securely fitted a focusing ring 4 upon which are marked focusing marks 4a and a release button lock mark 4b. At the lower end of the sleeve 5 is securely fixed a cam plate 6 having a cam groove 6a, an upright connecting arm 6b and a depending hook arm 6c. The upper end of the upright connecting arm 6a of the cam plate 6 is fitted into a groove 4c formed in the side surface of the focusing ring 4 so that the cam plate 6 may be rotated in unison with the focusing ring 4. A connecting member 7 has a cam follower pin 8 extending from one end thereof to be fitted into the cam groove 6a of the cam plate 6, an inversed L-shaped and bifurcated arm 7a in engagement with the focusing pin 1a of the lens barrel mount 1, and a pointer 7b extending into a viewfinder frame 12.

When the focusing ring 4 is rotated, the cam plate 6 is also rotated through arm 6b so that the connecting member 7 is caused to slide to the right or left because the cam follower pin 8 is moved by the cam groove 6a of the cam plate 6. Therefore the lens barrel mount 1 maybe caused to rotate in the clockwise direction or counterclockwise direction to move the camera lens 2 for focusing by rotation of focusing ring 4. In this case, the pointer 7b of the connecting member 7 indicates one of the focusing marks 11 marked in a picture frame mark 12a of the viewfinder frame 12. More particularly, an operator rotates the focusing ring 4 in such a way that one of the focusing marks 4a may coincide with an index mark X marked on a stationary member of the camera body depending upon the distance to a subject to be photographed. Thus the desired focusing may be obtained and indicated in the field of the viewfinder.

When the focusing ring 4 is so rotated that the shutter release button lock mark 4b coincides with the index mark X, the shutter release button 3 is locked so that the shutter cannot be released as will be described in more detail hereinafter. The cam profile of the cam groove 6a is so designed that when the focusing ring 4 is rotated from the position shown in FIG. 1, that is the position at which the infinity focusing mark is aligned with the index mark X, to the position at which the lock mark 4b is aligned with the index mark X, the cam groove 6a does not move the cam follower pin 8. More particularly, the section of the cam groove 6a corresponding to the above described rotation of the focusing ring 4 is an arc of a circle whose center coincides with the axis of the cam plate 6 so that the lens 2 remains in the infinity focusing position.

Next the release button locking mechanism will be described hereinafter. A shutter release member 9 has a horizontally bent upper portion 9a which is made to contact the lower end of the shutter release button 3. The shutter release member 9 is normally biased upwardly by means of a spring or the like (not shown) so that the release button 3 is also normally upwardly biased. The upper end portion 9a has a projection 9aa. When the release button 3 is depressed, the release member 9 is lowered against the spring or the like to release the shutter through a mechanism (not shown). When the focusing ring 4 is rotated to lock the shutter release button 3, the depending hook arm 6c of the cam plate 6 is also rotated so that the hook portion 6ca is moved below the projection 9aa. Therefore the downward movement of the shutter release button 3 may be prevented. According to one of the features of the present invention in this case, the depending arm 6c is also adapted to release a movable contact 10a of an on-off switch 10 for an exposure meter (not shown) from its stationary contact 10b so that a power source (not shown) of the exposure meter may be prevented from being wasted by supplying power for nothing.

Second Embodiment, FIG. 2

The second embodiment shown in FIG. 2 is substantially similar in construction and mode of operation to the first embodiment described hereinbefore with reference to FIG. 1 except that a focusing pin 2aa is fixed to the front end of a lens barrel 2a in parallel with the optical axis. The lens barrel 2a is then screwed into a stationary member 1b such as a helicoid ring.

What is claimed is:

1. A remote focusing device for a camera comprising:
   a. means rotatable for moving a camera lens in the direction of the optical axis thereof for focusing,
   b. a connecting member slidably disposed for rotating said camera lens moving means, c. a focusing ring rotatably and coaxially disposed around a shutter release button and provided with focusing marks marked around the periphery of its top surface, d. a cam plate provided with a focusing cam and coupled so as to be rotatable in unison with said focusing ring, e. a cam follower in engagement with said focusing cam of said cam plate and drivingly coupled to said connecting member so as to slide the same in accordance with the movement of said focusing ring, and f. a focus index mark marked upon a camera body in association with said focusing marks.

2. A remote focusing device as in claim 1 further comprising:

g. a shutter release member having a projection thereon and movable in unison with said shutter release button, h. a shutter release button lock mark marked upon the top surface of said focusing ring, and i. a hook arm formed integral with said cam plate such that when said focusing ring is so rotated as to align said lock mark with said focus index mark, said hook arm of said cam plate is moved into cooperation with the projection on said shutter release member, thereby preventing the downward movement of said shutter release button.

3. A remote focusing device as in claim 2 further comprising a switch having a movable contact and a stationary contact and wherein when said focusing ring is so rotated as to align said lock mark with said focus index mark, said hook arm of said cam plate engages the movable contact, thereby releasing said movable contact from the stationary contact of said switch to open said switch.

4. A remote focusing device as in claim 1 further comprising:

g. focusing marks corresponding to said focusing marks upon said focusing ring disposed so as to be viewed in the field of a viewfinder, and h. a pointer for indicating one of said focusing marks in said viewfinder disposed on said connecting member, whereby the focusing set by said focusing ring may be indicated in the viewfinder.

5. A remote focusing device as in claim 1 wherein said focusing cam comprises a cam groove in said cam plate having a portion thereof in the form of the arc of a circle whose center coincides with the axis of the cam plate.

6. A remote focusing device as in claim 1 wherein said camera lens moving means comprises a focusing pin on the lens barrel mount.

7. A remote focusing device as in claim 1 wherein said camera lens moving means comprises a focusing pin on the lens barrel.

* * * * *